United States Patent [19]
Ouchi

[11] Patent Number: 5,938,346
[45] Date of Patent: Aug. 17, 1999

[54] ROLLING BEARING UNIT WITH ROTATING SPEED SENSOR

[75] Inventor: Hideo Ouchi, Fujisawa, Japan

[73] Assignee: NSK Ltd., Tokyo, Japan

[21] Appl. No.: 08/779,530

[22] Filed: Jan. 7, 1997

[30] Foreign Application Priority Data

Jan. 10, 1996 [JP] Japan .................................. 8-002424
Dec. 9, 1996 [JP] Japan .................................. 8-328174

[51] Int. Cl.[6] .................................................. F16C 19/08
[52] U.S. Cl. .......................................................... 384/448
[58] Field of Search .................................. 384/446, 448, 384/544, 589, 489

[56] References Cited

U.S. PATENT DOCUMENTS 5,434,503  7/1995  Rigaux et al. .

FOREIGN PATENT DOCUMENTS 0 522 933  1/1993  European Pat. Off. .
0 531 924  3/1993  European Pat. Off. .
2 251 694  7/1992  United Kingdom .

*Primary Examiner*—Lenard A. Footland
*Attorney, Agent, or Firm*—Evenson, McKeown, Edwards & Lenahan, PLLC

[57] ABSTRACT

A rolling bearing unit with rotating speed sensor comprising a stationary ring having an opening end portion and a peripheral surface formed with a first raceway, a rotatable ring having a peripheral surface formed with a second raceway, a plurality of rolling members provided between the first and second raceways, a generally annular tone wheel supported by the rotatable ring and comprising a multi-pole magnet having S-poles and N-poles alternately arranged in a circumferential direction, a cover fixed to the opening end portion, and a sensor supported by the cover and having a front face opposed to the tone wheel and a rear face to which a magnetic member is placed close.

4 Claims, 8 Drawing Sheets

5,938,346

ROLLING BEARING UNIT WITH ROTATING SPEED SENSOR

FIELD OF THE INVENTION

The present invention is related to a rolling bearing unit with rotating speed sensor which can be used in the suspension of a vehicle to support a vehicle wheel so that it rotates freely, and to detect the rotating speed (rpm) of the vehicle wheel.

DESCRIPTION OF THE RELATED ART

In order to control an anti-lock brake system (ABS) or traction-control system (TCS), it is necessary to detect the rotating speed (rpm) of the vehicle wheel. Therefore a rolling bearing unit with rotating speed sensor that can be used in a vehicle suspension to rotatably support the vehicle wheel and to detect the rotating speed (rpm) of the vehicle wheel is necessary. This kind of rolling bearing unit with rotating speed sensor has been known previously, for example, by the construction of a device such as disclosed in U.S. Pat. No. 4,948,277. Incidentally, the rotating speed sensor is also referred to as rpm sensor in this specification.

FIG. 10 shows an example of the rolling bearing unit with rpm sensor as disclosed in the prior art. A pair of stationary inner rings 1 is fixed onto a non-rotatable axle (not shown) when it is installed in the vehicle suspension. A stationary inner ring raceway 2 is formed on the outer peripheral face (also referred to an stationary peripheral face) of each of the inner rings 1. Also, rotating double-row raceways 4 are formed on an inner peripheral face (also referred to as rotating peripheral face) of a rotating wheel or hub 3 which is rotatable when in use. Rolling elements or balls 5 are located between each of the outer ring raceways 4 and each of the inner ring raceways 2 go as to support rotatable the hub 3 around the axle. A vehicle wheel (not shown) is fitted on a flange (only its base portion is illustrated) provided the outer peripheral surface of the hub 3.

An opening portion is provided at the axially inner end of the hub 3, and a reinforcing metal 7 for the seal ring 6 is fitted into the opening portion. Here, the term "axially inner" means the widthwise central direction when installed in the automobile; the right side in the Figures except for FIGS. 2 and 5; and the term "axially outer" means the widthwise outer direction when installed in the automobile.

The reinforcing metal 7 has an outer peripheral rim portion formed with a cylindrical portion 8 which is fitted into the opening portion of the hub 3 in an interference fit relationship.

Supported securely on the axially inner side face of the reinforcing metal 7 is a seal member 9 which is made from an elastic material such as rubber, elastomer etc.

Supported securely on the axially inner side face of the seal member 9 is a tone wheel 10 which is made in an annular shape from permanent magnets such that N-poles and S-poles are circumferentially provided and alternately arranged.

A support ring 11 formed by deep-drawing a metal plate is fitted and fixed on the axially inner end portion of the axially inside one of the inner rings 1.

The seal member 9 of the seal ring 6 is formed with seal lips 12 the tip portions of which are provided in sliding contact with the inner and outer peripheral faces and axially outer face of the support ring 11 in order to prevent the ingress of dust and rainwater into the install section of the bearing balls 5 mentioned above.

And a sensor 13 is supported and fixed in one part of the support ring 11, and the detecting portion provided on the front face (left side face in FIG. 10) of this sensor 13 is opposed to the axially inner side face of the above tone wheel 10.

Such a rolling bearing unit with rpm sensor, the vehicle wheel secured to the hub 3 is supported rotatably with reference to the axle on which the inner rings 1 are fitted. As the hub 3 with the vehicle wheel is rotated, the sensor 13 opposed to the side face of the tone wheel 10 fixed on the hub 3 changes its output corresponding to the density and direction change of the magnetic flux passing through the sensor 13. The frequency at which the output of the sensor 13 is changed is proportional to the rotating velocity of the vehicle wheel. Accordingly, by inputting the output signal of the sensor 13 into the control device (not shown), the rotational velocity of the vehicle wheel is obtained so as to control the ABS and/or the TCS in a suitable manner.

In the case of the above-mentioned prior art structures, the tone wheel 10 must have a larger magnetic force in order to securely obtain a sufficient output of the sensor 13, which leads to cost-up in the production of the tone wheel 10, and therefore of the rolling bearing unit with rpm sensor having the tone wheel 10 installed in it. This reason is as follows:

The output of the sensor 13 must be sufficiently secured in order to securely detect the rotating speed of the automobile rotating with the hub 3, an in turn, the magnetic flux emanating from the axially inner side face of the tone wheel or permanent magnet 10 and passing through the sensor 13 must have a higher density in order to securely obtain the output of the sensor 13.

On the other hand, in the case of the structure of FIG. 10, since no magnetic material exists on the rear face side of the sensor 13 (the side opposed to the front face where the detecting portion is opposed to the tone wheel 10; right side face of FIG. 10), the density of the magnetic flux passing through the sensor 13 is not necessarily high.

Specifically, the S-poles and N-poles are circumferentially alternately arranged on the axially inner side face of the tone wheel 10, a magnetic flux emanating from each of the N-poles is inclined to flow toward the adjacent S-poles, as shown by arrows in FIG. 11. In FIG. 11, the tone wheel 10 is rotated as shown by a dotted arrow. In this moment, although part of the magnetic flux flows through the sensor 13, a substantial part or fraction of the magnetic flux from the N-poles is inclined to the adjacent S-poles without passing through the sensor 13.

Although it is possible to increase the ratio or fraction of the magnetic flux flowing through the sensor 13 by shortening the distance between the tone wheel 10 and the sensor 13, it is difficult to extremely reduce the distance because the interference between the tone wheel 10 and the sensor 13 must be positively prevented.

SUMMARY OF THE INVENTION

One objective of the present invention is to provide a rolling bearing unit with rotating speed sensor in which the magnetic flux emanating from the tone wheel is efficiently led to the sensor to securely obtain the sufficiently large output of the sensor even without enforcing the magnetic force of the tone wheel, or without extremely shortening the distance between the tone wheel and the sensor, whereby the above-mentioned problems in the prior art are overcome.

DETAILED DESCRIPTION OF THE PREFERRED EMBODIMENTS

A rolling bearing unit with rotating speed sensor according to the present invention, comprises a stationary ring which does not rotate during use and has an open end portion and a stationary peripheral surface formed with a stationary raceway, a rotatable ring which is rotatable during use and has a rotating peripheral surface formed with a rotating raceway, a plurality of rolling elements which are provided between the stationary and rotating raceways, a generally annular tone wheel which is supported by the rotatable ring and comprised of a multi-pole magnet having S-poles and N-poles alternately arranged in a circumferential direction, a cover which is fixed to the open end portion of the stationary ring, and a sensor which is supported by the cover and has a front face opposed to the tone wheel and a rear face to which a magnetic member is placed close or contacted.

According to the rolling bearing unit with rotating speed sensor of the present invention, the vehicle wheel is rotatably supported and fixed to the rotatable ring while the speed sensing of the vehicle wheel is detected in a substantially same manner as in the prior art rolling bearing unit.

In the rolling bearing unit with rotating speed sensor of the present invention, the magnetic flux emanating from the tone wheel is efficiently led to the sensor to securely obtain the sufficiently large output of the sensor even without enforcing the magnetic force of the tone wheel, or without extremely shortening the distance between the tone wheel and the sensor. Specifically, a substantial fraction of the magnetic flux coming out of the N-poles of the tone wheel flows toward the magnetic member provided on the rear face side of the sensor, and passes through the sensor. As a result, the density of the magnetic flux passing through the sensor is large to improve the sensor output.

Figure 1:
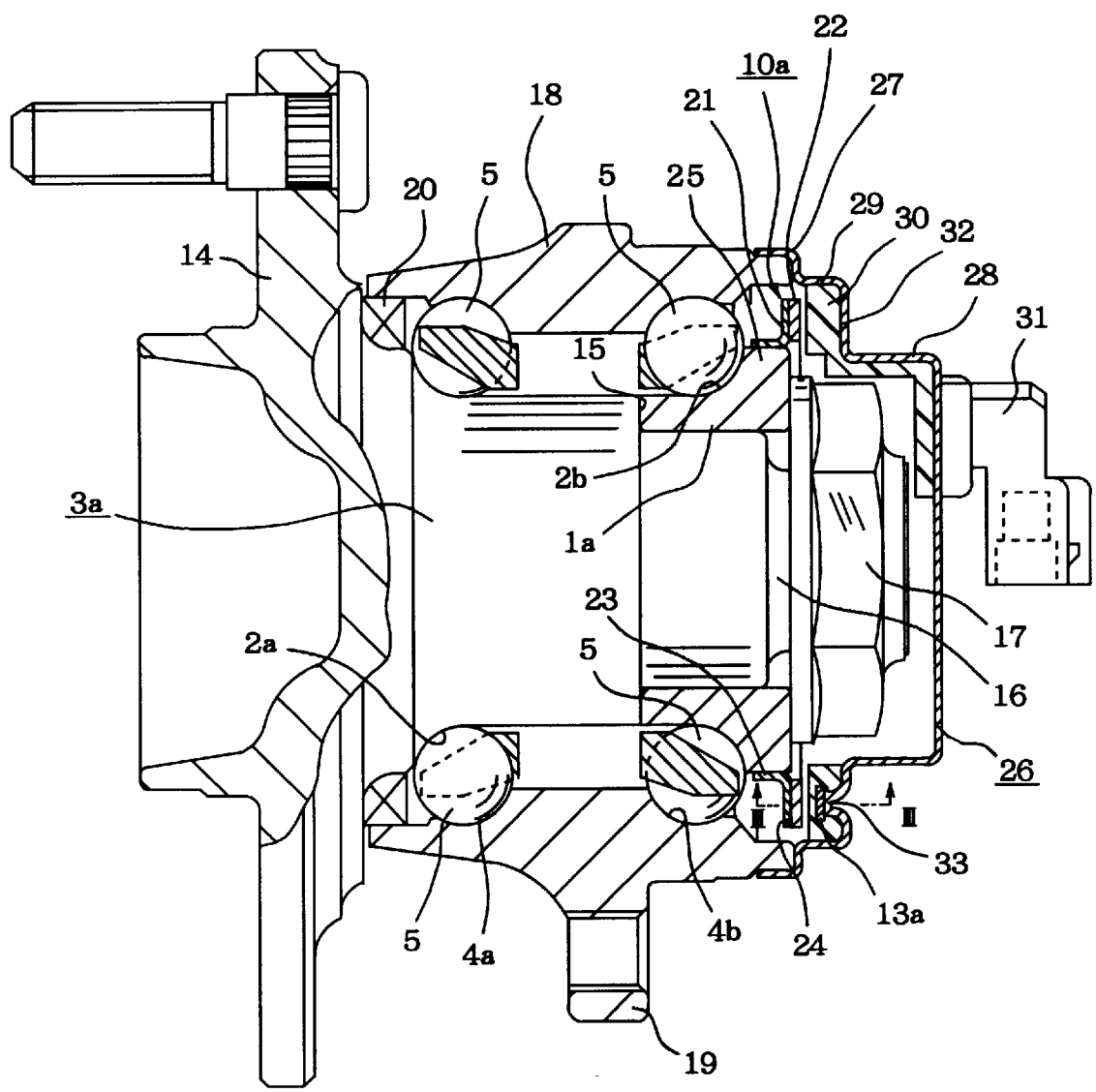
FIG. 1 is a cross sectional view taken along the line I—I in FIG. 2, showing an embodiment of the present invention.
Figure 2:
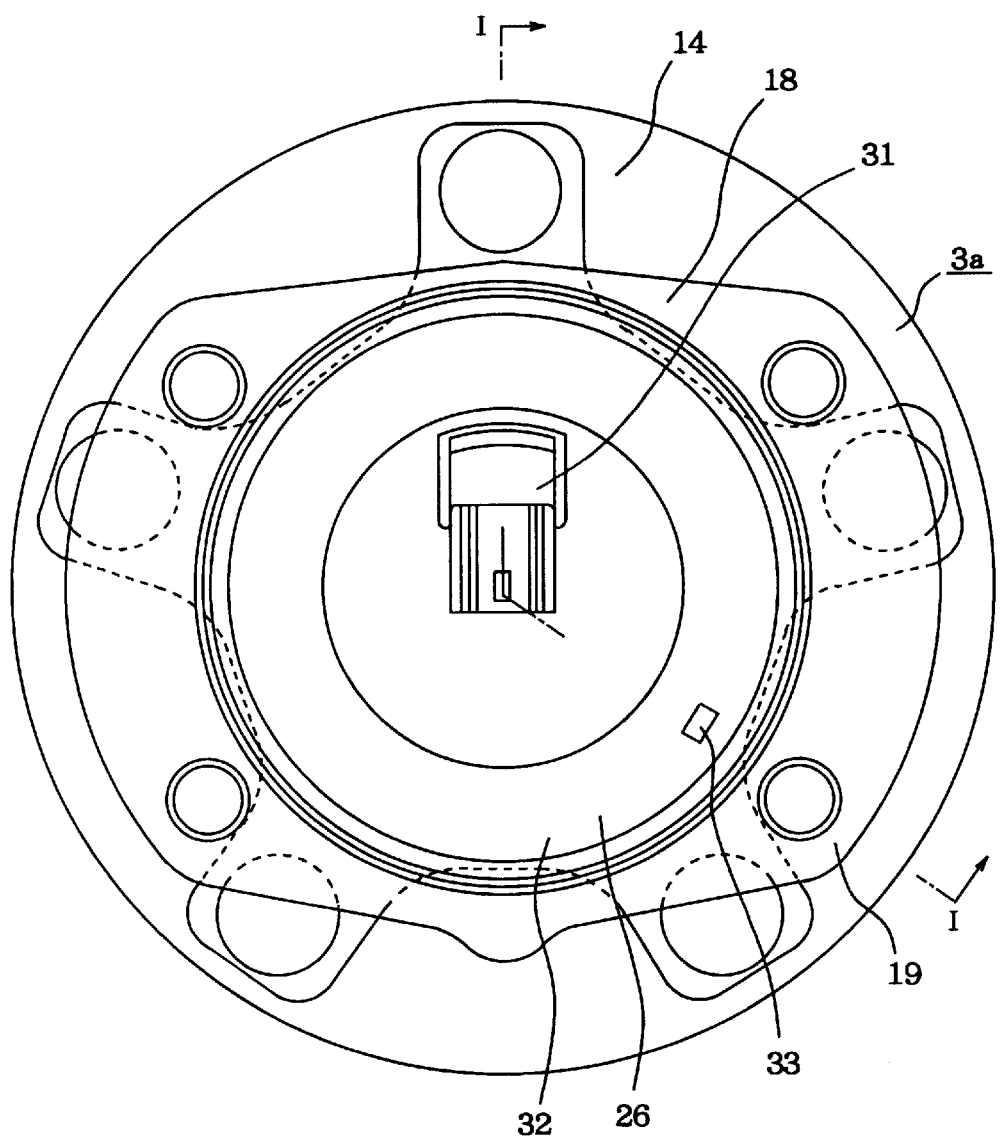
FIG. 2 is a right elevational view of the example of FIG. 1.
Figure 3:
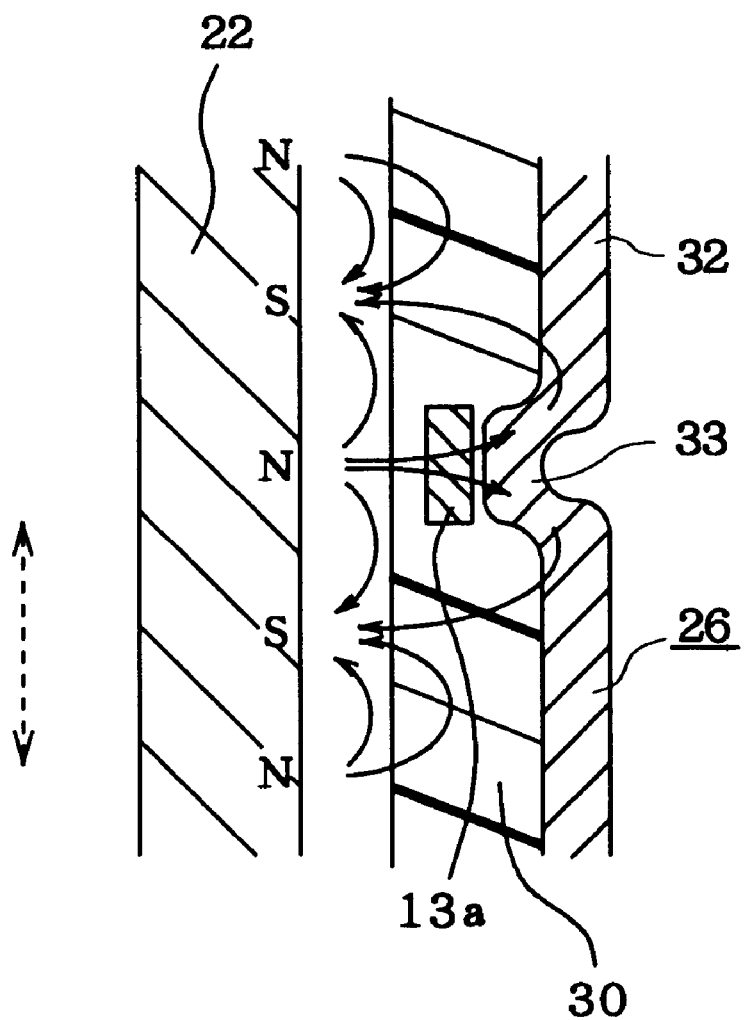
FIG. 3 is a partly cut-away, enlarged view of a portion taken along the line III—III in FIG. 1

FIGS. 1–3 show a first example of an embodiment of the present invention. A hub 3a constituting a rotating ring, has an outer peripheral face (rotating peripheral face) at the axially outer end formed with a flange 14 for wheel fixture, and a central outer peripheral face formed with an inner ring race way (rotating race way) 2a and with a step portion 15.

An inner ring 1a constituting the rotating ring together with the hub 3a, is externally fitted to the hub 3a on the axially inner end thereof. The inner ring 1a is formed with an inner ring raceway (rotating raceway) 2b on an outer peripheral face (rotating peripheral face) thereof, and is externally fitted to the hub 3a, with an axially outer end face thereof abutted against the step portion 15.

Instead of directly forming the inner ring raceway 2a on the outer peripheral face of the hub 3a, the inner ring raceway 2a may be formed on an inner ring (not shown) separate from the hub 3a, which is externally fitted to the hub 3a together with the inner ring 1a.

A male-threaded portion 16 is formed on an axially inner end portion of the hub 3a. The inner ring 1a is secured at a predetermined location on the outer peripheral face of the hub 3a by means of a nut 17 which is threaded onto the male-threaded portion 16 and tightened, thus making up the rotating ring.

An outer ring (stationary ring) 18, which is located around the hub 3a, is provided with an attachment portion 19 on a central outer peripheral face thereof, for securing the outer ring 18 to a suspension unit (not shown).

An inner peripheral face (stationary peripheral face) of the outer ring 18, is formed with respective outer ring raceways 4a, (stationary raceways) 4b opposite to the respective inner ring raceways 2a, 2b.

A plurality of balls (rolling elements) 5 are respectively provided between the inner ring raceways 2a, 2b and the outer ring raceways 4a, 4b, so that the hub 3a is free to rotate inside the outer ring 18. With the example shown in the figures, balls 5 are used for the rolling elements. However in the case of a rolling bearing unit for heavy vehicles, tapered rollers may be used for the rolling elements.

A seal ring 20 is fitted between the inner peripheral face at the axially outer end of the outer ring 18, and the outer peripheral face of the hub 3a, to cover the outer end opening of the space in which the plurality of balls 5 are provided, between the inner peripheral face of the outer ring 18 and the outer peripheral face of the hub 3a.

A tone wheel 10a is externally fixed to a shoulder portion 25 on an axially inner end portion of the inner ring 1a away from the inner ring raceway 2b. The tone wheel 10a is formed in a generally annular shape, by assembling together a support ring 21 and a tone wheel body 22. Of these parts, the support ring 21 is made from a magnetic metal plate such as a steel plate, formed into an overall annular shape of L-shape in cross-section, and comprised of a cylindrical portion 23 and a ring portion 24 bent radially outwards from an axially inner rim of the cylindrical portion 23. This support ring 21 is secured to the inner ring 1a by press fitting the cylindrical portion 23 onto the shoulder portion 25.

The tone wheel body 22 is comprised of permanent magnets and magnetized in the axial direction (left-right direction in FIG. 1). The magnetized direction is changed alternately and at even spacing around the circumferential direction. To achieve this, S-poles and N-poles are arranged alternately on the axially inner face of the tone wheel body 22 at even spacing.

For the permanent magnets making up the tone wheel body 22, various permanent magnets such as rubber magnets, plastic magnets, ferrite magnets and the like may be used.

An opening portion at the axially inner end of the outer ring 18 is covered with a cover 26 made in the form of a bottomed cylinder, by for example, deep-drawing a magnetic metal plate such as steel plate. The cover 26 is formed in a crank shape in cross section and comprised of a large diameter portion 27 on an opening portion at the axially outer end (left end in FIG. 1) thereof, which is externally fitted to the opening portion of the outer ring 18 at the axially inner end thereof, a small diameter portion or base portion 28 at the axially inner end (right side in FIG. 1), having an inner diameter and axial dimension so as to positively prevent interference with the nut 17, and an intermediate diameter portion 29 between the small diameter portion 28 and the large diameter portion 27. An annular synthetic resin block 30 with a sensor 13a embedded therein, is fixedly retained on the inside of the intermediate diameter portion 29. This sensor 13a, known as an active sensor, is made up by fitting a magnetic sensor such as a Hall IC, or a magnetic resistance element (MR element), which gives an output changing corresponding to the direction of a passing magnetic flux. The output signal from the sensor 13a is taken out by means of a connector 31 provided on the base portion 28 of the cover 26.

An annular portion 32 extends radially so as to connect the axially outer rim of the small diameter portion 28 and the axially inner rim of the intermediate diameter portion 29, and a protrusion 33 is formed on part of the annular portion 32 on a portion facing the rear face (right side face in FIGS. 1, 3) of the sensor 13a, so that the tip end face of the protrusion 33 and the rear face of the sensor 13a are in close proximity to each other, or in contact to each other.

When using a rolling bearing unit with rotating speed sensor of this construction, then when the tone wheel 10a rotates together with the hub 3a fixed to the vehicle wheel, the magnetic poles opposite to the tip end face of the sensor 13a changes alternately, so that the output signal from the sensor 13a changes at a frequency proportional to the rotational speed of the hub 3a. In this respect, the operation itself of the rolling bearing unit with rotating speed sensor of the present invention, which rotatably supports the vehicle wheel, and also detects the rotational speed of the vehicle wheel, is substantially the same as for the beforementioned conventional rolling bearing unit with rotating speed sensor.

However, in the case of the rolling bearing unit with rotating speed sensor of the present invention, the magnetic flux output from the N poles arranged at even spacing on the axially inner side face of the tone wheel body 22 which forms the tone wheel 10a, is efficiently guided towards the sensor 13a supported on the inside of the cover 26. That is to say, the plurality of N-poles and S-poles are provided on the axially inside face of the tone wheel body 22, which rotates as shown by a dotted arrow, and the major part of the magnetic flux output from the N-poles, when faced to the front face of the sensor 13a as shown in FIG. 3, flows towards the protrusion 33 formed in proximity to the rear face of the sensor 13a. Therefore, the output from the sensor 13a can be sufficiently maintained even without strengthening the magnetic force of the tone wheel body 22, or without making the separation distance between the inner side face of the tone wheel body 22 and the tip face of the sensor 13a very small. Moreover, with this example, by forming the protrusion 33 on one portion of the originally existing cover 26, then a magnetic material is provided immediately behind the rear face of the sensor 13a. The protrusion 33 can be easily formed at the same time as forming the cover 26. Consequently, the cost increase with providing a magnetic material becomes minimal.

Figure 4:
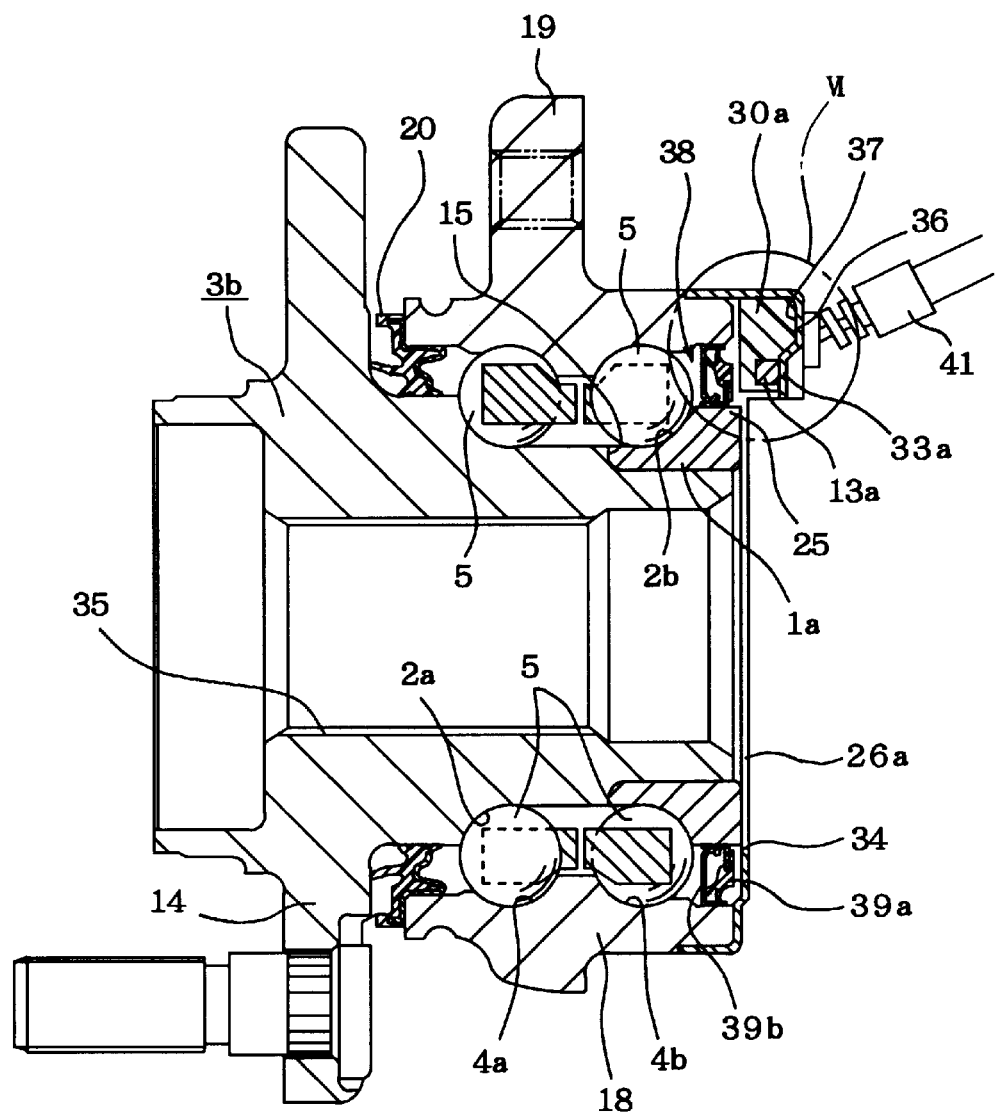
FIG. 4 is a cross sectional view taken along the line IV—IV in FIG. 5, showing another embodiment of the present invention.
Figure 5:
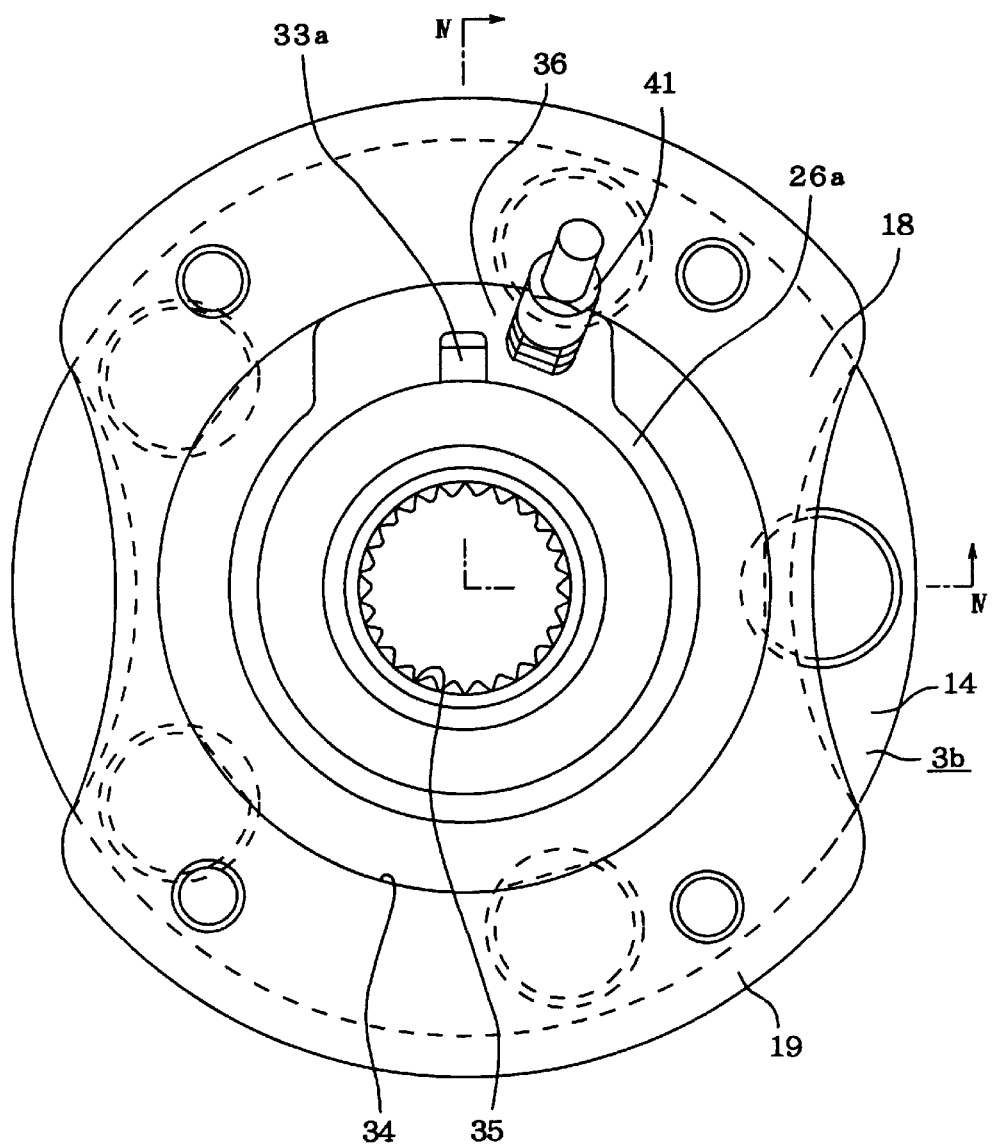
FIG. 5 is a right side elevational view of the example of FIG. 4.
Figure 6:
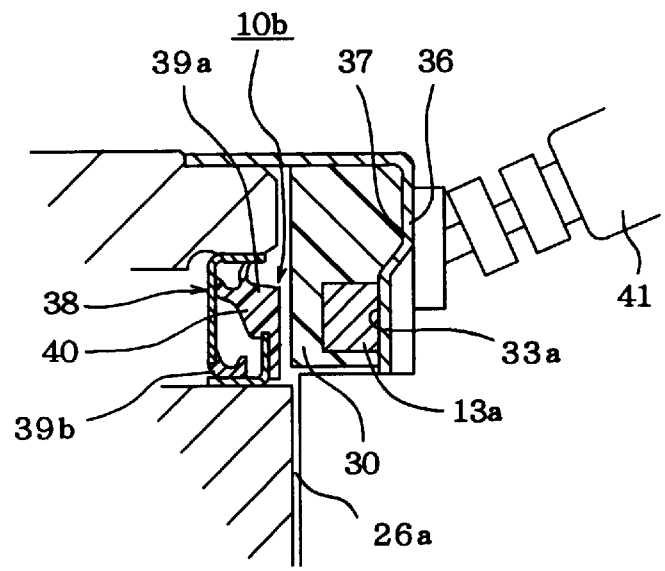
FIG. 6 is an enlarged view of portion VI in FIG. 4.

FIGS. 4 through 6 show a second example of an embodiment of the present invention. The case for the first example described above is for where the present invention is applied to a rolling bearing unit for supporting a non-driven wheel (front wheel of a front engine rear wheel drive vehicle or rear wheel of a front engine front wheel drive vehicle). However, with this example, the present invention is applied to a rolling bearing unit for supporting the driven wheel (rear wheel of a front engine rear wheel drive vehicle or front wheel of a front engine front wheel drive vehicle). Therefore, with the present example, a hub 3b is formed in a cylindrical shape, and a spline member 35 for spline engagement with an outer peripheral face of a drive shaft (not shown in the figure), is formed on the inner peripheral face of the hub 3b. A cover 26a externally fitted to the opening portion of the outer ring 18 at the axially inner end, is formed in an annular shape with a central aperture 34 for insertion of the drive shaft.

An enlarged portion 36 is formed on a circumferential portion around the periphery of the cover 26a to axially inwardly protrude. A synthetic resin block 30a with a sensor 13a embedded therein, is fixedly retained inside the enlarged portion 36. A protrusion 33a is formed on a part of an inner wall 37 defined by the inside face of the enlarged portion 36, on a portion facing the rear face of the sensor 13a. The tip end face of the protrusion 33a and the rear face of the sensor 13a are thus in close proximity to each other, or in contact with each other. The output signal from the sensor 13a is taken out by a harness 41, which passes out from the inner face of the enlarged portion 36.

A composite seal ring 38 is provided between the inner peripheral face on the axially inner end of the outer ring 18 and the outer peripheral face of the shoulder portion 25 of the inner ring 1a, to thereby seal between the two peripheral face pairs. Of the pair of seal rings 39a, 39b forming this composite seal 38, the seal ring 39a facing the sensor 13a, is formed integral with a tone wheel 10b. That is to say, a seal member 40 of this seal ring 39a is made up of rubber magnets with ferromagnetic material powder such as ferrite mixed into rubber, and with S-poles and N-poles provided alternately on the axially inner side face of the seal member 40 at even spacing around the circumferential direction, thus having the function of the tone wheel 10b.

Due to the construction of this example formed in the above manner, the operation of rotationally supporting the vehicle wheel and detecting the rotational speed of the vehicle wheel, and the operation of guiding the major portion of the magnetic flux output from the N pole of the tone wheel 10b to the sensor 13a, and thereby sufficiently maintaining the output from the sensor 13a, is substantially the same as for the construction of the abovementioned first example. Moreover, with the present example also, the increase in cost with providing a magnetic material immediately behind the rear face of the sensor 13a becomes minimal.

Figure 7:
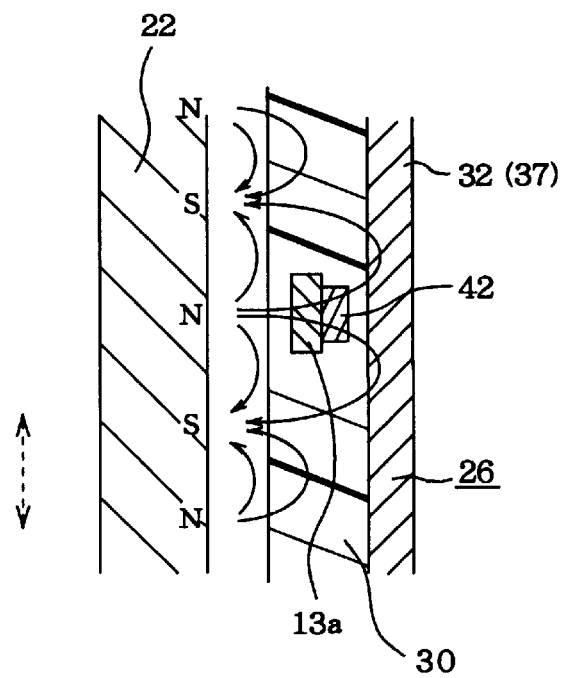
FIG. 7 is a view similar to FIG. 3, showing another embodiment of the present invention.

FIG. 7 shows a third example of an embodiment of the present invention. With this example, as with the beforementioned first example, a synthetic resin block 30 with a sensor 13a embedded therein, is fixedly retained on one part of a cover 26 made from a magnetic metal plate such as steel plate (or from a non magnetic metal plate). With this example however, the protrusion 33 (FIGS. 1–3) as for the case of the first example, is not formed in the cover 26. Instead, with this example, a magnetic metal piece 42 is provided separate from the cover 26, on the rear face (right face in FIG. 7) of the sensor 13a. Furthermore, the front face (left face in FIG. 7) of the magnetic metal piece 42 is in close proximity to or abutted against the rear face of the sensor 13a, while the rear face of the magnetic metal piece 42 is close to the cover 26. With the example of this construction also, as with the case of the beforementioned first example or second example, a major part of the magnetic flux output from the N-poles of the tone wheel body 22 flows to the sensor 13a, so that the output from the sensor 13a can be sufficiently maintained. In order to realize the construction of this example, preferably the sensor 13a and the magnetic metal piece 42 are bonded together beforehand so that these two members 13a, 42 do not separate prior to embedding in the synthetic resin molding 30.

Figure 8:
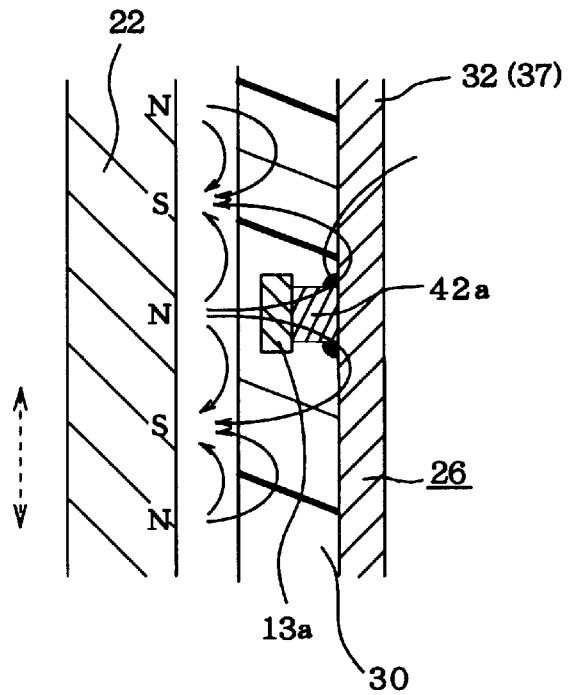
FIG. 8 is a view similar to FIG. 3, showing another embodiment of the present invention.

FIG. 8 shows a fourth example of an embodiment of the present invention. With this example, as with the beforementioned first and third examples, a synthetic resin block 30 with a sensor 13a embedded therein, is fixedly retained on one part of a cover 26 made from a magnetic metal plate such as steel plate. With this example however, a magnetic metal piece 42a is fixed to the axially outer face of the cover 26 by welding, and the rear face of the sensor 13a is positioned close to or in abutment with the front face of the magnetic metal piece 42a. With the example of this construction also, as with the case of the beforementioned respective examples, a major part of the magnetic field output from the N pole of the tone wheel body 22 flows to the sensor 13a, so that the output from the sensor 13a can be sufficiently maintained.

Figure 9:
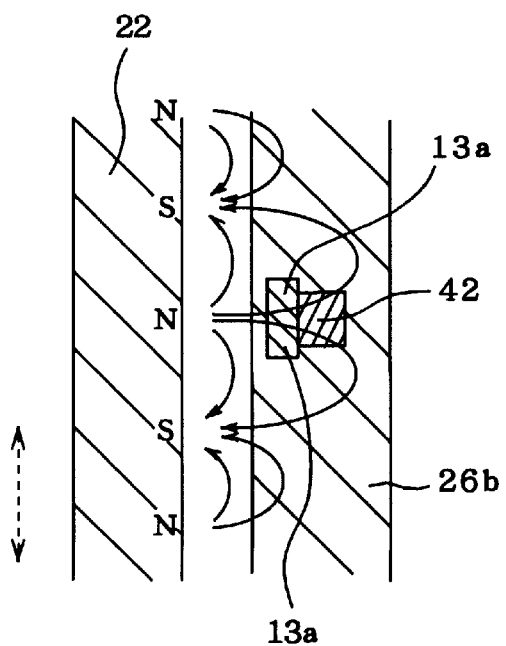
FIG. 9 is a view similar to FIG. 3, showing another embodiment of the present invention.
Figure 10:
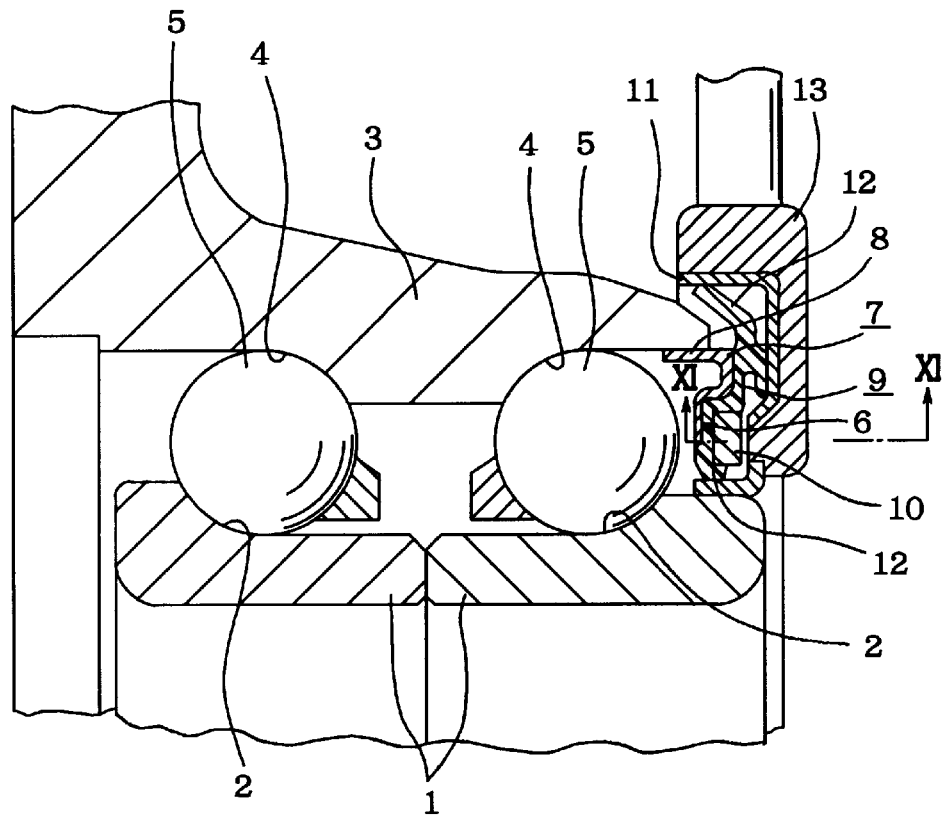
FIG. 10 is a cross sectional view showing an example in the prior art structures.
Figure 11:
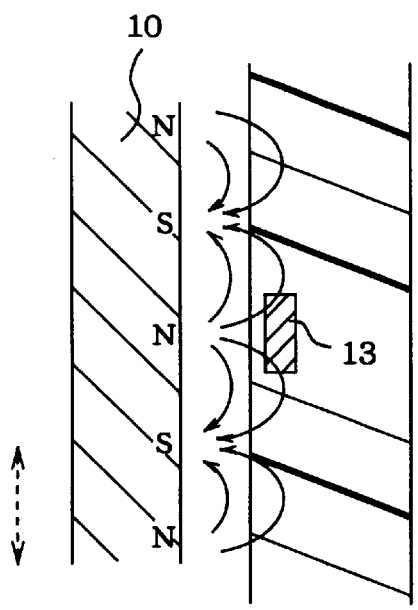
FIG. 11 is a partly cut-away enlarged view taken the line XI—XI in FIG. 10.

FIG. 9 shows a fifth example of an embodiment of the present invention. With this example, a cover 26b is made by injection forming a synthetic resin which is a non magnetic material. Furthermore, a sensor 13a and a magnetic metal piece 42 are embedded in the synthetic resin cover 26b as with the third example shown in FIG. 7 where the sensor 13a and the magnetic metal piece 7 are embedded in the synthetic resin molding 30. The rear face of the sensor 13a and the front face of the magnetic metal piece 42 are in close proximity to each other, or in contact with.

With the example of this construction also, as with the case of the beforementioned respective examples, a major part of the magnetic flux output from the N-poles of the tone wheel body 22 flows to the sensor 13a, so that the output from the sensor 13a can be sufficiently maintained.

Now, the construction of the third through fifth examples shown in FIGS. 7 through 9, can be applied not only to the rolling bearing unit for the non driven wheal as shown in FIGS. 1 through 3, but also to the rolling bearing unit for the driven wheel as shown in FIGS. 4 though 6. Moreover, the construction for any of the rolling bearing units is not limited to the case where the outer ring is the stationary ring and the inner ring is the rotating ring, but also embodies the case where the outer ring is the rotating ring and the inner ring is the stationary ring.

In the rolling bearing unit with rotating speed sensor of the present invention as constructed above, the magnetic flux emanating from the tone wheel is efficiently led to the sensor to securely obtain the sufficiently large output of the sensor even without enforcing the magnetic force of the tone wheel, or without extremely shortening the distance between the tone wheel and the sensor, so as to provide an inexpensive rolling bearing unit with rotating speed sensor for securely detecting the rotating speed of the vehicle wheel.

What is claimed is:

1. A rolling bearing unit with rotating active speed sensor comprising a stationary ring having an opening end portion and a peripheral surface formed with a first raceway thereon, a rotatable ring having a peripheral surface formed with a second raceway thereon, a plurality of rolling members provided between the first and second raceways, a generally annular tone wheel supported by the rotatable ring and comprising a multi-pole magnet having S-poles and N-poles alternately arranged in a circumferential direction, a cover fixed to the opening end portion of the stationary ring, a sensor supported by the cover and having a front face opposed to the tone wheel and a rear face, and a magnetic member placed close to the rear face of the sensor, wherein the cover is made from a magnetic metal plate, and has a portion integrally formed with a projection portion faced to and projected toward the rear face of the sensor such that the projection portion has a tip end face placed close to the rear face of the sensor.

2. A rolling bearing unit with rotating active speed sensor comprising a stationary ring having an opening end portion and a peripheral surface formed with a first raceway thereon, a rotatable ring having a peripheral surface formed with a second raceway thereon, a plurality of rolling members provides between the first and second raceways, a generally annular tone wheel supported by the rotatable ring and comprising a multi-pole magnet having S-poles and N-poles alternately arranged in a circumferential direction, a cover fixed to the opening end portion of the stationary ring, a sensor supported by the cover and having a front face opposed to the tone wheel and a rear face, and a magnetic member placed close to the rear face of the sensor, wherein the cover is made from a magnetic metal plate, and has a portion integrally formed with a projection portion faced to and projected toward the rear face of the sensor such that the projection portion has a tip end face placed in contact with the rear face of the sensor.

3. A rolling bearing unit with rotating active speed sensor comprising a stationary ring having an opening end portion and a peripheral surface formed with a first raceway thereon, a rotatable ring having a peripheral surface formed with a second raceway thereon, a plurality of rolling members provided between the first and second raceways, a generally annular tone wheel supported by the rotatable ring and comprising a multi-pole magnet having S-poles and N-poles alternately arranged in a circumferential direction, a cover fixed to the opening end portion of the stationary ring, a sensor supported by the cover and having a front face opposed to the tone wheel and a rear face, and a magnetic member placed in contact with the rear face of the sensor, wherein the cover is made from a magnetic metal plate, and has a portion integrally formed with a projection portion faced to and projected toward the rear face of the sensor such that the projection portion has a tip end face placed close to the rear face of the sensor.

4. A rolling bearing unit with rotating active speed sensor comprising a stationary ring having an opening end portion and a peripheral surface formed with a first raceway thereon, a rotatable ring having a peripheral surface formed with a second raceway thereon, a plurality of rolling members provided between the first and second raceways, a generally annular tone wheel supported by the rotatable ring and comprising a multi-pole magnet having S-poles and N-poles alternately arranged in a circumferential direction, a cover fixed to the opening end portion of the stationary ring, a sensor supported by the cover and having a front face opposed to the tone wheel and a rear face, and a magnetic member placed in contact with the rear face of the sensor, wherein the cover is made from a magnetic metal plate, and has a portion integrally formed with a projection portion faced to and projected toward the rear face of the sensor such that the projection portion has a tip end face placed in contact with the rear face of the sensor.

* * * * *